United States Patent
Watanabe et al.

(10) Patent No.: US 6,287,465 B1
(45) Date of Patent: *Sep. 11, 2001

(54) OZONE DEODORIZER

(75) Inventors: Masanori Watanabe, Kamagaya; Fumio Hayashi, Tokyo; Hiroshi Dazai, Yokohama, all of (JP)

(73) Assignee: Ishikawajima-Harima Jukogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,128
(22) PCT Filed: Feb. 16, 1998
(86) PCT No.: PCT/JP98/00610
  § 371 Date: Oct. 14, 1998
  § 102(e) Date: Oct. 14, 1998
(87) PCT Pub. No.: WO99/41202
  PCT Pub. Date: Aug. 19, 1999

(51) Int. Cl.$^7$ .................................................. B01D 53/34
(52) U.S. Cl. ..................... 210/192; 210/916; 239/398; 261/DIG. 42; 422/168
(58) Field of Search ..................... 210/150, 192, 210/205, 218, 760, 916; 261/76, DIG. 42; 423/220, 224; 422/4, 5; 239/398

(56) References Cited

U.S. PATENT DOCUMENTS

| 3,949,055 | * | 4/1976 | Schneider et al. | 423/220 |
| 4,550,010 | * | 10/1985 | Chelu | 422/4 |
| 4,652,370 | * | 3/1987 | Bachofer et al. | 210/192 |
| 4,844,874 | * | 7/1989 | DeVries | 423/210 |
| 5,017,351 | * | 5/1991 | Rafson | 423/245.2 |
| 5,494,576 | * | 2/1996 | Hoppe et al. | 210/205 |
| 5,501,401 | * | 3/1996 | Munk | 239/431 |
| 5,593,598 | * | 1/1997 | McGinness et al. | 210/760 |

FOREIGN PATENT DOCUMENTS

| 54-2265 | | 6/1977 | (JP) . |
| 55-5775 | * | 1/1980 | (JP) . |
| 4-22747 | | 7/1987 | (JP) . |
| 3002318 | | 3/1994 | (JP) . |

* cited by examiner

*Primary Examiner*—David A. Simmons
*Assistant Examiner*—Frank M. Lawrence
(74) *Attorney, Agent, or Firm*—Oblon, Spivak, McClelland, Maier & Neustadt, P.C.

(57) ABSTRACT

Provided are an ozone generator 24 for generating ozone, an atomizer nozzle 27 arranged inside and adjacent to a top of a sewage-treating waste water treatment vessel 16 for spraying ozone and water in mixture, a compressor 25 for supplying ozone generated by the ozone generator 24 to the atomizer nozzle 27 and a pump 26 for supplying water to the atomizer nozzle 27. Surface of the sewage is covered with ozone and fine water particles which are sprayed from the atomizer nozzle 27 into the waste water treatment vessel 16, and hydroxyl radical with high activity is generated by the ozone and water molecules In the fine water particles to oxidize the smell components, resulting in suppressing diffusion of offensive smell out of the waste water treatment vessel 16.

8 Claims, 2 Drawing Sheets

OZONE DEODORIZER

FIELD OF THE INVENTION

The present invention relates to an ozone deodorizer for deodorizing a waste water treatment vessel.

BACKGROUND ART

Household waste water from homes and industrial waste water from offices are collected through sewage work to waste water treatment facilities where the waste water is purified by various treatments and then is discharged to rivers and/or seas.

On the other hand, various deodorizers are used to suppress diffusion of offensive smell from sewage collected at the waste water treatment facilities.

FIG. 1 illustrates an example of a waste water treatment system or facility where an ozone deodorizer as disclosed in Japanese Utility Model 3002318 is applied. This waste water treatment system comprises an upwardly opened treatment vessel body 1, a cover 2 on the vessel body 1 and an exhaust pipe 4 vertically extending through the cover 2 and having an exhaust fan 3 at its intermediate portion.

The treatment vessel body 1 is buried in the ground such that the cover 2 is positioned near the ground surface. Provided inside the vessel body 1 are pre-treatment, adjustment and aeration vessels 5, 6 and 7.

Sewage to be treated flows from outside into the pre-treatment vessel 5 via a screen 8 which serves to remove relatively large dust and refuse.

The sewage treated in the pre-treatment vessel 5 flows over a weir between the vessels 5 and 6 into the adjustment vessel 6 since new sewage flows from outside into the vessel 5. Likewise, the sewage treated in the adjustment vessel 6 flows over a weir between the vessels 6 and 7 into the aeration vessel 7 since new sewage flows from the pre-treatment vessel 5 into the adjustment vessel 6.

Further, the sewage, which has been purified by the various treatments in the vessels 5, 6 and 7 to have BOD (biochemical oxygen demand) and the like values within levels as allowable by laws, regulations and the like, is pumped from the aeration vessel 7 by a pump (not shown) and is discharged to rivers and/or seas.

The ozone deodorizer comprises a filter box 9 for removing particulates and the like in the air through filtration of the air, an oxygen generator 10 for extracting oxygen ($O_2$) by applying and reducing pressure on the air filtered through the filter box 9, an ozone generator 11 for generating ozone ($O_3$) by applying high voltage on the oxygen from the oxygen generator 10, a fan 12 for sucking and discharging the air, a discharge pipe 13 extending through the cover 2 such that its upstream and downstream portions are positioned above and below the cover 2, respectively, and a plurality of branch pipes 15 connected to the downstream portion of the discharge pipe 13 and communicated with a space 14 defined by the cover 2 and the treatment vessel body 1.

The above-mentioned filter box 9, oxygen generator 10, ozone generator 11 and fan 12 are arranged outside the treatment vessel body 1. An ozone outlet of the ozone generator 11 and an air outlet of the fan 12 are connected to the upstream portion of the discharge pipe 13.

In the waste water treatment system shown in FIG. 1, actuation of the oxygen generator 10, ozone generator 11, and fan 12 causes mixture of ozone generated by the ozone generator 11 with the air from the fan 12 to flow through the discharge pipe 13 and branch pipes 15 into the space 14 defined by the cover 2 and vessel body 1.

The ozone contained in this mixture oxidizes smell components such as hydrogen sulfide ($H_2S$) and ammonia ($NH_3$) emitted from the sewage to be treated in the vessels 5, 6 and 7 to reduce the offensive smell.

However, half-life of ozone in the atmospheric air is about 13 hours. As is disclosed in the above, reaction rate of oxidation of the smell components emitted from the sewage inside the waste water treatment system is not very high. Relatively long time is required for the reaction of ammonia with ozone so that the reaction may be carried out inefficiently within the limited time.

From these reasons, in the waste water treatment system shown in FIG. 1, the offensive smell components emitted from the sewage may not be sufficiently oxidized by ozone and may be discharged together with unreacted ozone to outside through the exhaust pipe 4, resulting in diffusion of the offensive smell outside the waste water treatment system.

The present invention was made in view of the above and has its object to provide an ozone deodorizer which can efficiently eliminate smell components.

DISCLOSURE OF THE INVENTION

In an ozone deodorizer according to the invention, ozone generated by an ozone generator is supplied to an atomizer nozzle by gas supply means. Water is supplied to the atomizer nozzle by water supply means. Thus, hydroxyl radicals with high activity of oxidizing smell components are generated by the ozone and water molecules of fine water particles sprayed by the atomizer nozzle into the waste water treatment vessel.

BEST MODE FOR CARRYING OUT THE INVENTION

An embodiment of the invention will be described in conjunction with the drawings.

Figure 1:
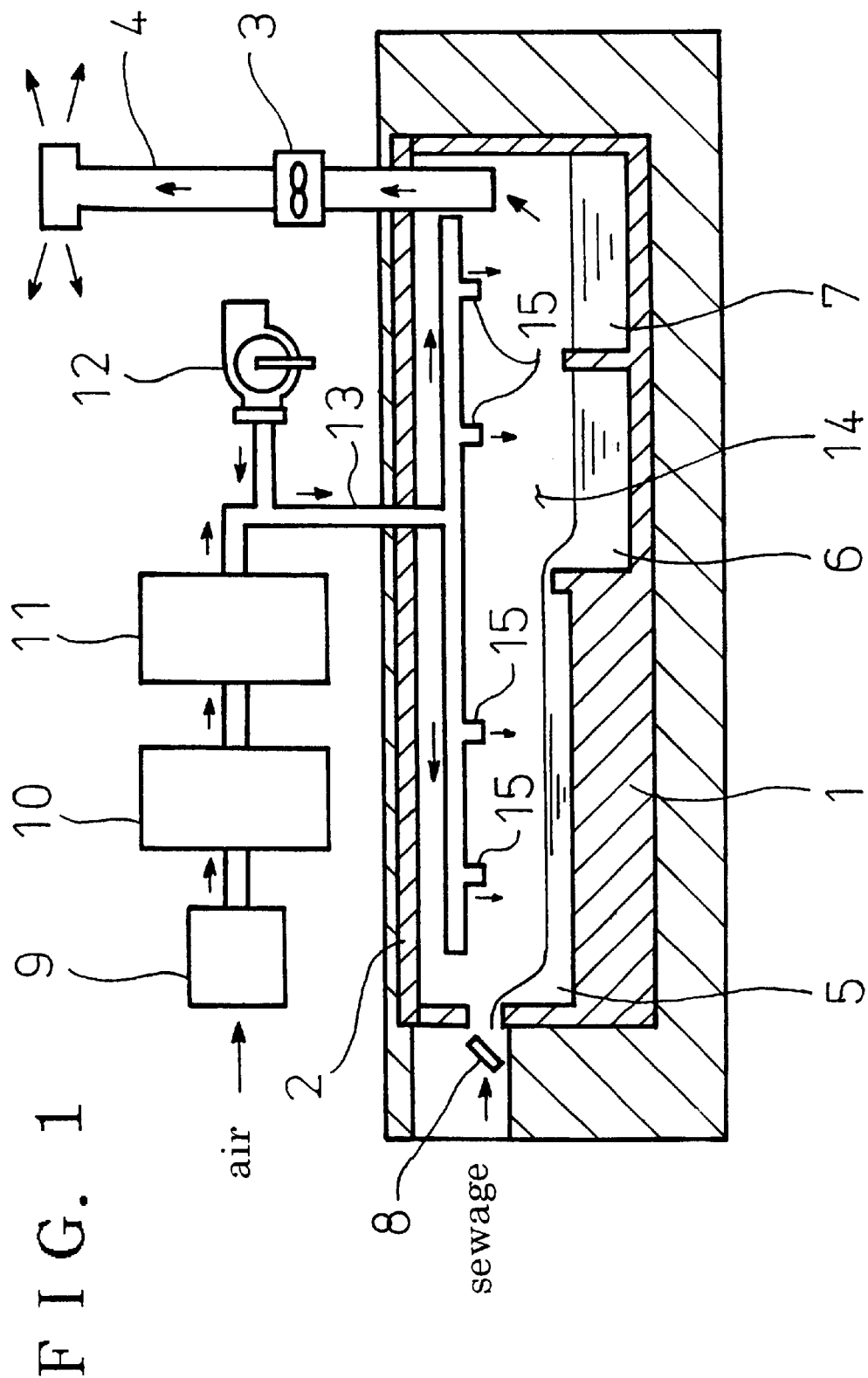
FIG. 1 is a schematic view of a waste water treatment system to which a conventional ozone deodorizer is applied.
Figure 2:
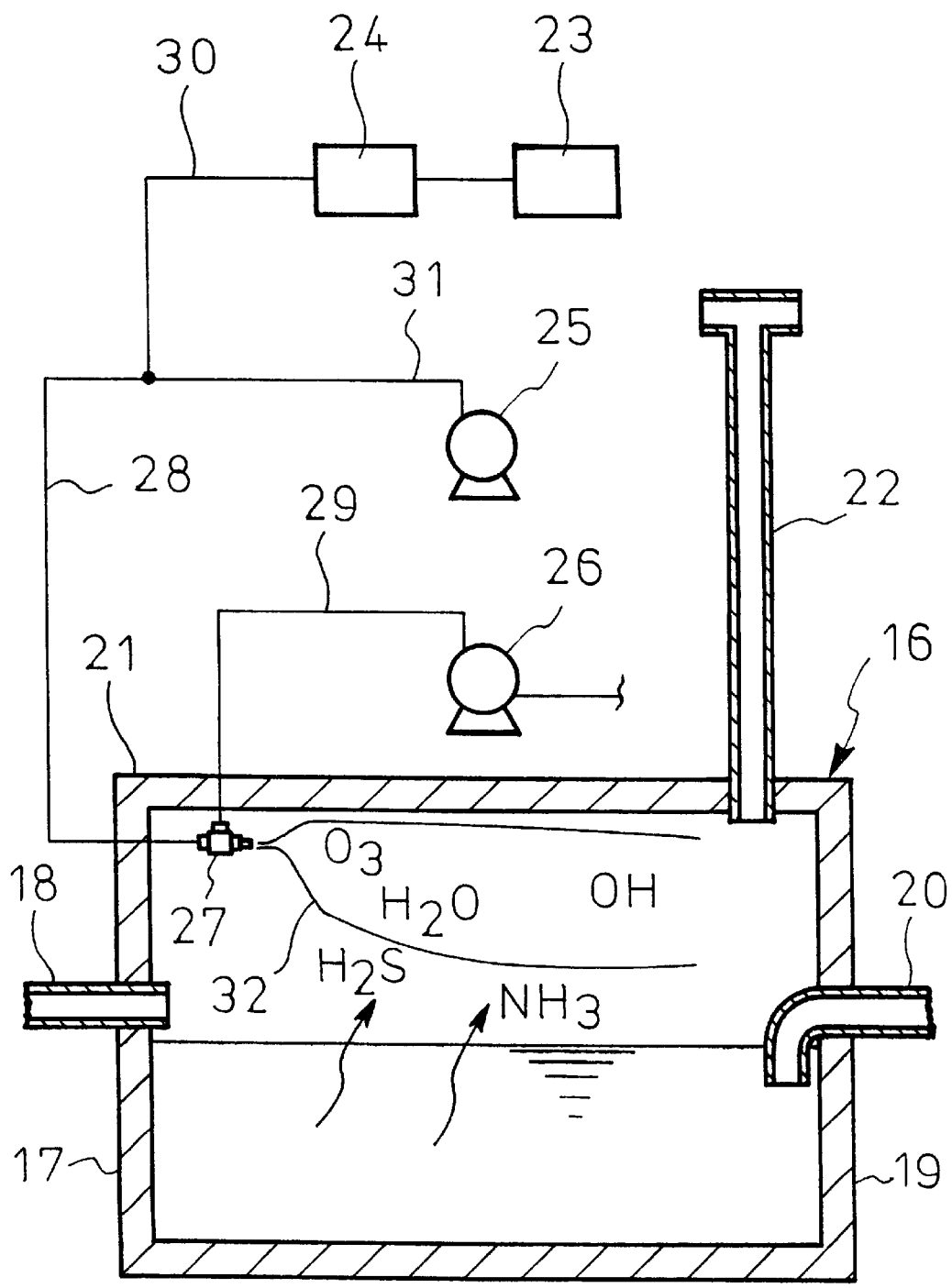
FIG. 2 is a schematic view of a waste water treatment vessel to which an embodiment of an ozone deodorizer according to the invention is applied.

FIG. 2 illustrates an embodiment of an ozone deodorizer according to the invention. A waste water treatment vessel 16 to which the ozone deodorizer is applied has an end wall 17 with an inflow pipe 18 for supplying the sewage to be processed or the sewage under treatment from the preceding process to a waste water treatment vessel 16. The waste water treatment vessel 16 further has the other end wall 19 with a discharge pipe 20 for feeding the sewage duly processed at the waste water treatment vessel 16 to the next process or discharging the same to rivers and/or seas.

The waste water treatment vessel 16 has an upper wall 21 with an exhaust pipe 22 which communicates inside of the waste water treatment vessel 16 with the external atmosphere.

The ozone deodorizer comprises an oxygen generator 23 for extracting oxygen ($O_2$) by applying and reducing pressure on the air, an ozone generator 24 for generating ozone ($O_3$) from the oxygen supplied from the oxygen generator 23, a compressor 25 for compressing and discharging the air, a pump 26 for sucking water stored in a water storage vessel (not shown) to discharge the water, an atomizer nozzle 27, an air supply pipe 28 extending through the wall 17 such that its upstream portion is positioned outside the treatment vessel 16 and its downstream portion is positioned inside and adjacent to a top on the treatment vessel 16 and a water supply pipe 29 extending through the upper wall 21 so that its upstream portion is positioned outside the treatment vessel 16 and its downstream portion is positioned inside and adjacent to the top on the treatment vessel 16.

The oxygen generator 23, ozone generator 24, compressor 25 and pump 26 are arranged outside the waste water treatment vessel 16. The atomizer nozzle 27 is positioned inside and adjacent to the top on the waste water treatment vessel 16.

The ozone generator 24 has an ozone outlet connected via an ozone supply pipe 30 to an upstream end of the air supply pipe 28. The compressor 25 has an air outlet connected via an air feed pipe 31 to the upstream end of the air supply pipe 28. Actuation of the oxygen generator 23, ozone generator 24 and compressor 25 causes mixture of ozone with the air to flow in the air supply pipe 28.

A downstream end of the air supply pipe 28 is connected to a gas inlet of the atomizer nozzle 27. A water discharge port of the pump 26 is connected via the water supply pipe 29 to a liquid inlet of the atomizer nozzle 27. Actuation of the oxygen generator 23, ozone generator 24, compressor 25 and pump 26 causes an ozone fog 32 in the form of mixture of ozone with fine water particles to be sprayed through the outlet of the atomizer nozzle 27.

The ozone generator 24 may be any of a generator to generate ozone by silent discharge to oxygen, a generator to generate ozone by creeping discharge to oxygen and a generator to generate ozone by ultraviolet ray irradiation to oxygen.

Next, mode of operation of the ozone deodorizer shown in FIG. 2 will be described.

The oxygen generator 23, ozone generator 24, compressor 25 and pump 26 are actuated when smell components are to be removed such as hydrogen sulfide ($H_2S$) and ammonia ($NH_3$) emitted from the sewage inside the waste water treatment vessel 16 in the purification treatment of the sewage In the vessel 16.

The oxygen generator 23 extracts oxygen contained in the air. The ozone generator 24 generates ozone from the oxygen extracted by the oxygen generator 23.

The ozone is fed to the air supply pipe 28 from the ozone outlet of the ozone generator 24 via the ozone supply pipe 30. The air compressed to a predetermined pressure is fed to the air supply pipe 28 from the air outlet of the compressor 25 via the air feed pipe 31. Mixture of ozone with the air flows via the air supply pipe 28 into the gas inlet of the atomizer nozzle 27.

Further, the water sucked by the pump 26 from the water storage vessel flows from the water discharge port of the pump 26 via the water supply pipe 29 into the liquid inlet of the atomizer nozzle 27.

As a result, the ozone fog 32 in the form of mixture of ozone with fine water particles is sprayed from the outlet of the atomizer nozzle 27 into the waste water treatment vessel 16 so that surface of the sewage in the waste water treatment vessel 16 is covered with the ozone fog 32.

In this case, water molecules ($H_2O$) in the fine water particles contained in the ozone fog 32 reacts with ozone to generate hydroxyl radical (OH radical) having high activity. The hydroxyl radicals and the ozone contained in the ozone fog 32 oxidize hydrogen sulfide, ammonia and the like emitted from the sewage to be treated in the waste water treatment vessel 16. Ammonia and other substances are dissolved in the fine water particles contained in the ozone fog 32 and are dropped down to the waste water treatment vessel 16. Smell is eliminated from the air and the air thus free from the smell is discharged out of the waste water treatment vessel 16 through the exhaust pipe 22.

The above-mentioned hydroxyl radical has high activity so that oxidizing rate of the smell components by hydroxyl radical is quicker than the oxidizing rate of the smell components by ozone. Also, ozone serves as a starting material to generate the hydroxyl radical. Thus, smell components or unreacted ozone are not contained in the air which is discharged from the waste water treatment vessel 16 through the exhaust pipe 22 and no smell diffuses out of the waste water treatment vessel 16.

It is to be understood that the ozone deodorizer according to the invention is not limited to the above-mentioned embodiment and that various changes and modifications may be made without departing from the spirit and the scope of the invention. For example, an ozone generator to generate ozone by electrolysis of water may be used instead of the oxygen generator. City water pipe may be connected to the water supply pipe via a stop valve instead of using the pump.

INDUSTRIAL APPLICABILITY

Ozone supplied by gas supply means and water supplied by water supply means are sprayed through an atomizer nozzle so that hydroxyl radicals with high activity are generated from ozone and water molecules in fine water particles and are suitably used for deodorization of the waste water treatment vessel.

What is claimed is:

1. An ozone deodorizer comprising:

an ozone generator configured to generate ozone;

a water supply having treatment water containing no sewage;

an atomizer nozzle arranged inside a sewage-treating waste water treatment vessel having sewage therein, and connected to said ozone generator and said water supply, said atomizer nozzle being configured to receive the ozone from said ozone generator and the the treatment water directly from said water supply and discharge a mixture of ozone and treatment water within the sewage-treating waste water treatment vessel as an ozone fog to deodorize the sewage-treating waste water treatment vessel; and a compressor connected via a pipe to an upstream side of a supply pipe connecting said ozone generator to said atomizer nozzle.

2. The ozone deodorizer of claim 1, further comprising an oxygen generator configured to generate oxygen and connected to said ozone generator.

3. The ozone deodorizer of claim 2, wherein said oxygen generator is arranged outside of the sewage-treating waste water treatment vessel.

4. The ozone deodorizer of claim 1, wherein said compressor is arranged outside of the sewage-treating waste water treatment vessel.

5. The ozone deodorizer of claim 1, wherein said atomizer nozzle is positioned adjacent to a top of the sewage-treating waste water treatment vessel.

6. The ozone deodorizer of claim 1, wherein said ozone generator is arranged outside of the sewage-treating waste water treatment vessel.

7. The ozone deodorizer of claim 1, wherein the ozone fog comprises ozone gas and fine water particles, and wherein the ozone gas and fine water particles react to generate hydroxyl radicals within the sewage-treating waste water treatment vessel.

8. The ozone deodorizer of claim 1, wherein said atomizer nozzle is configured to discharge the ozone fog above a surface of the sewage contained within the sewage-treating waste water treatment vessel.

* * * * *